April 25, 1939.  L. R. SPENCER  2,156,202
AIRPLANE ENGINE
Filed Dec. 23, 1936    7 Sheets-Sheet 1
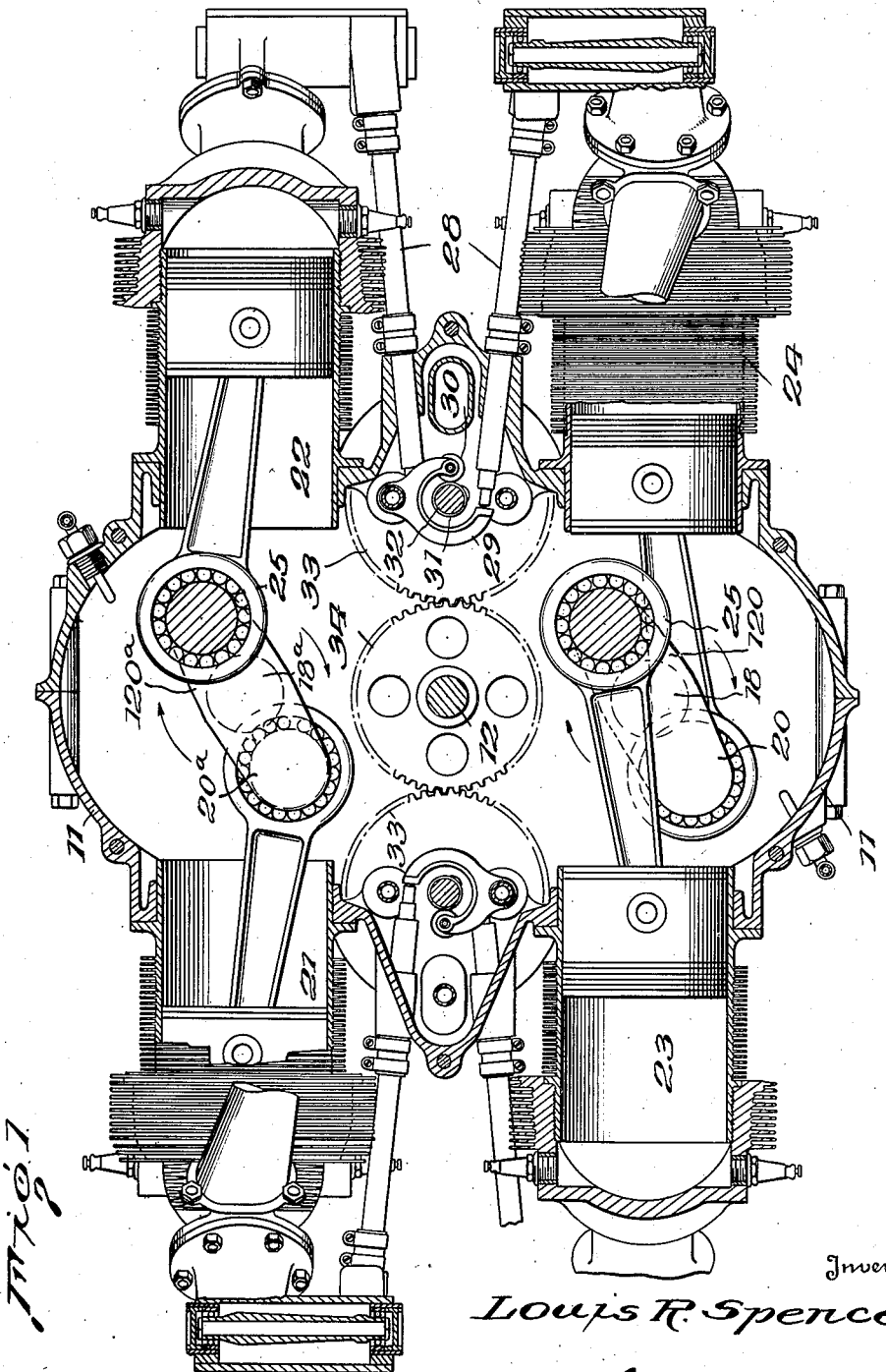
Inventor
Louis R. Spencer,
His Attorneys

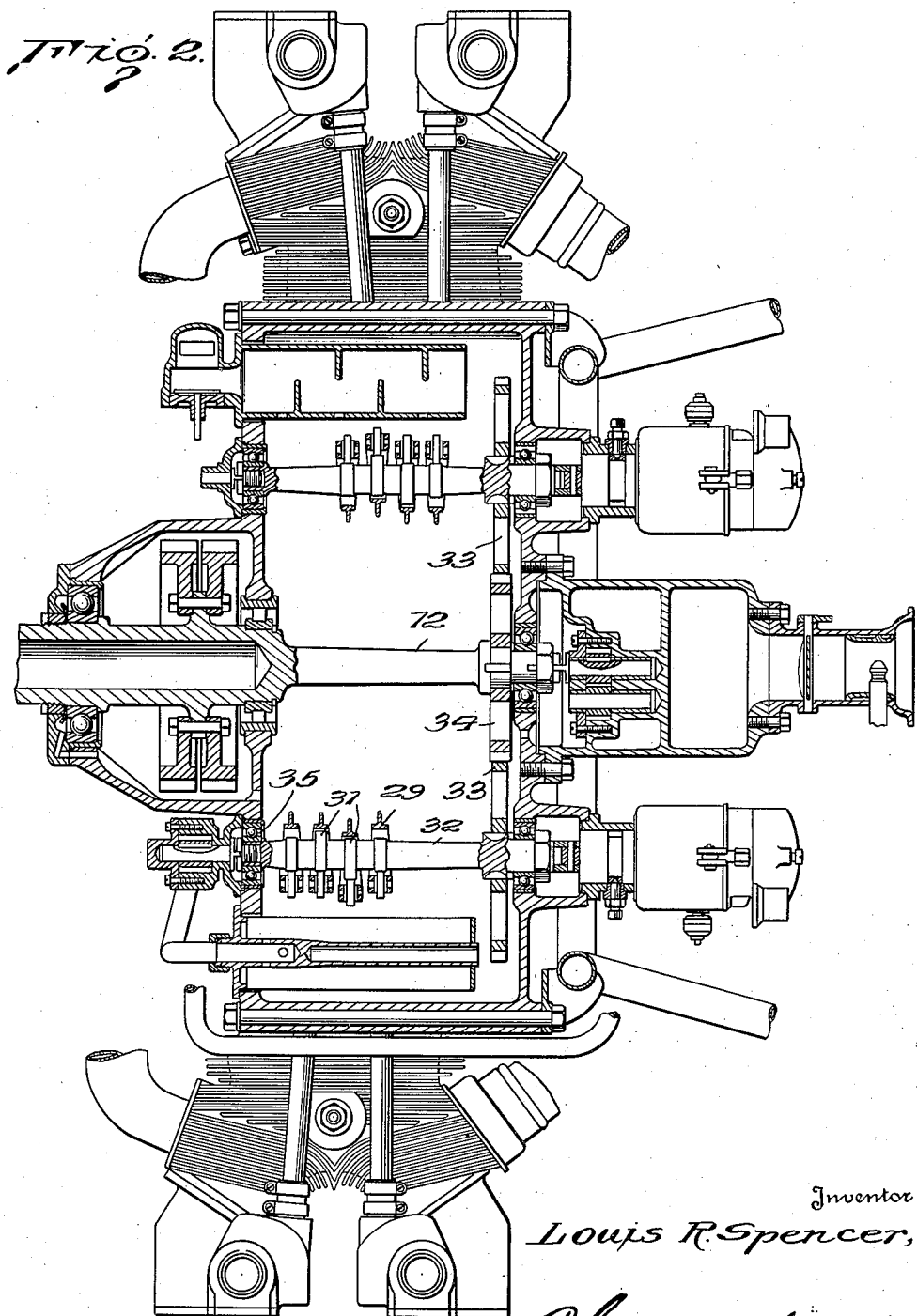

April 25, 1939.   L. R. SPENCER   2,156,202
AIRPLANE ENGINE
Filed Dec. 23, 1936    7 Sheets-Sheet 3
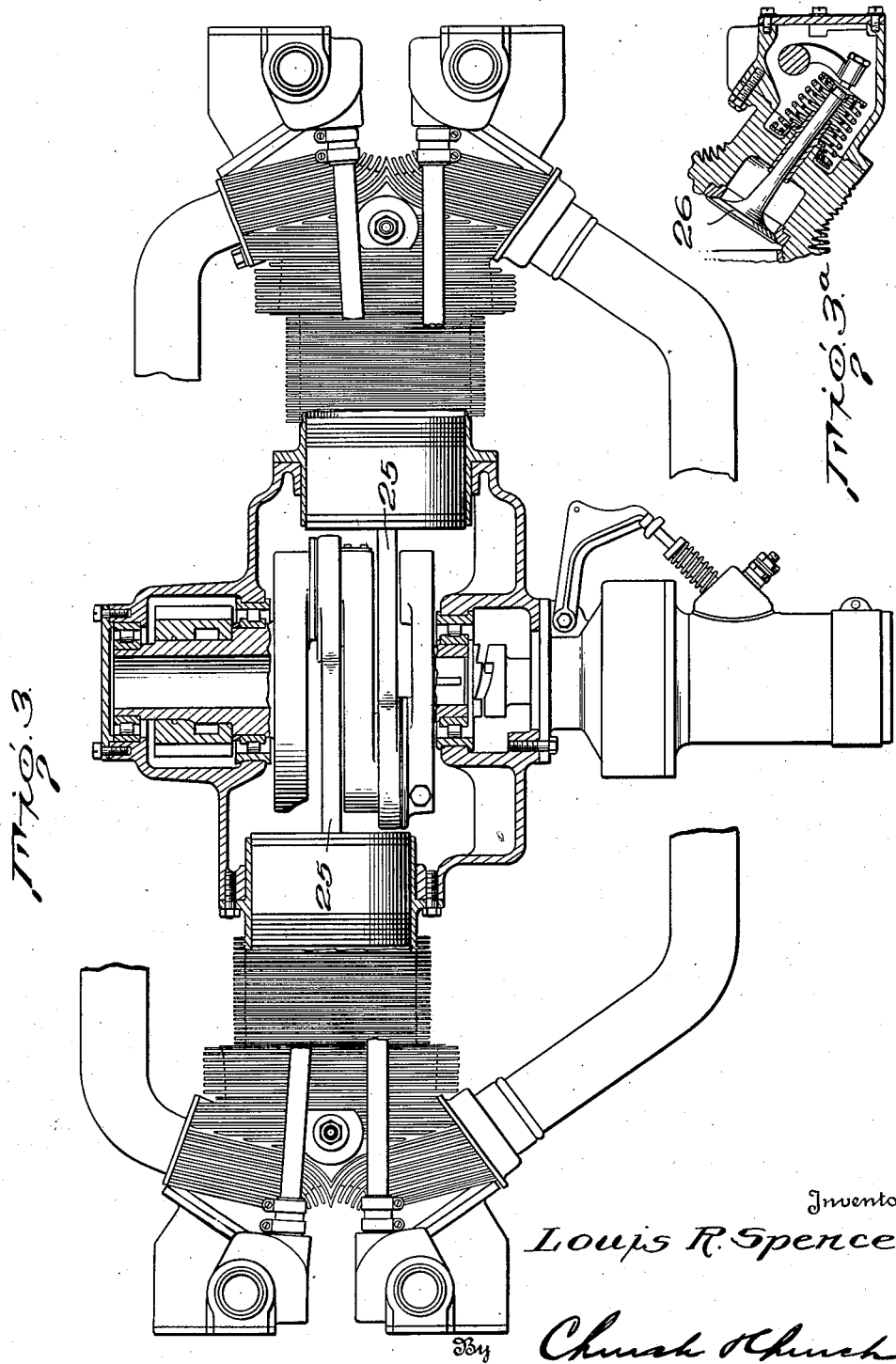
Inventor
Louis R. Spencer,
By Chuck Church
His Attorneys

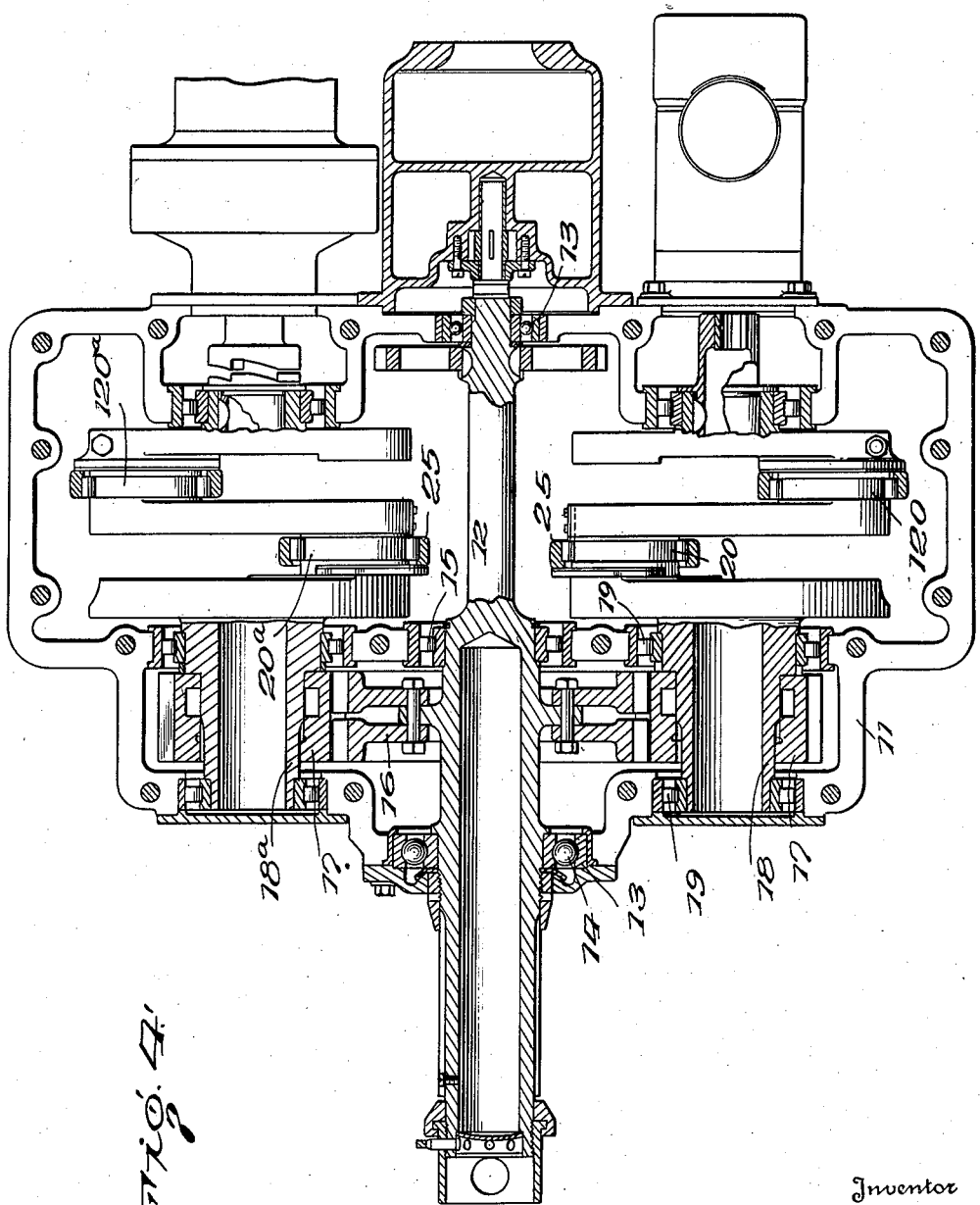

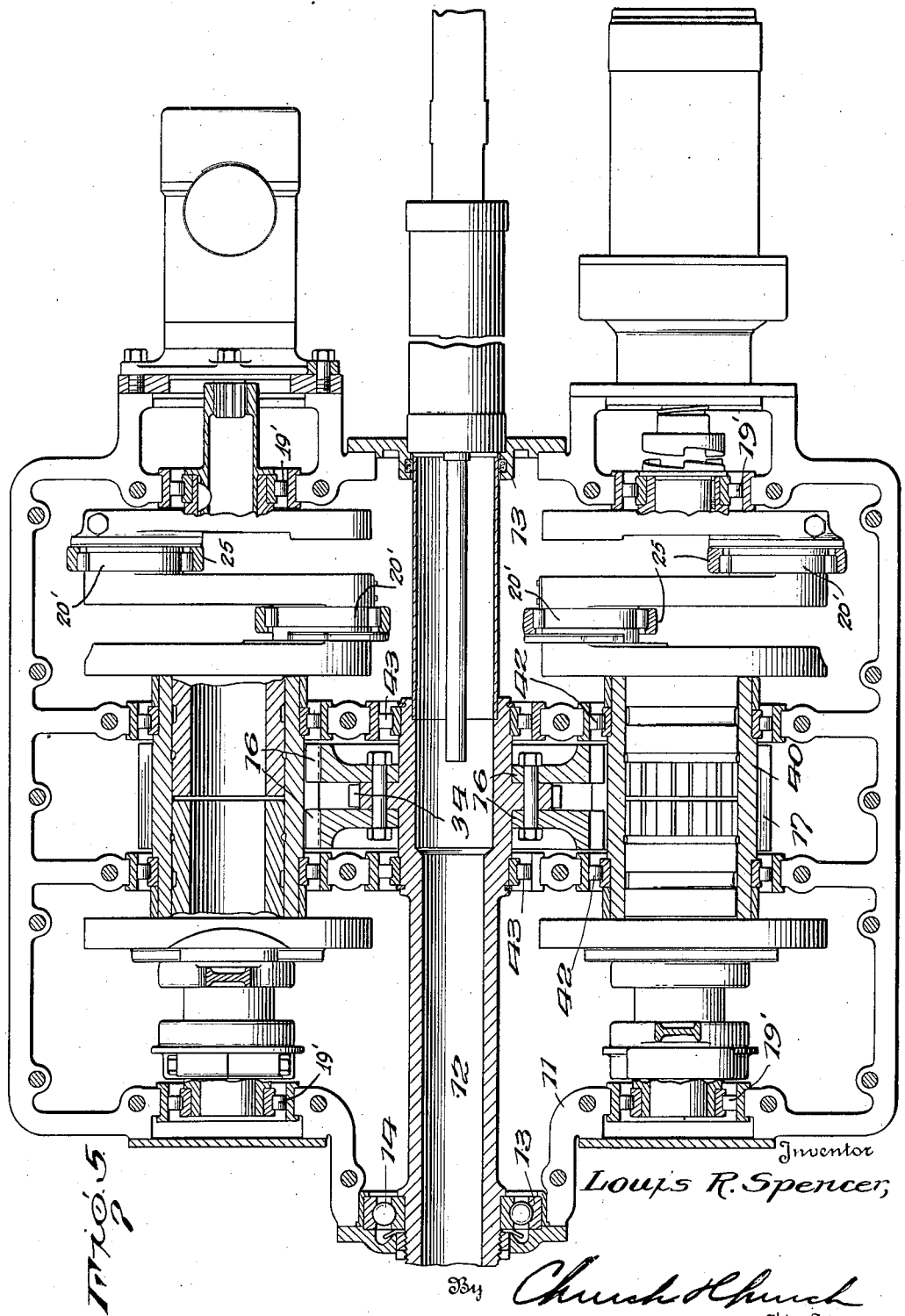

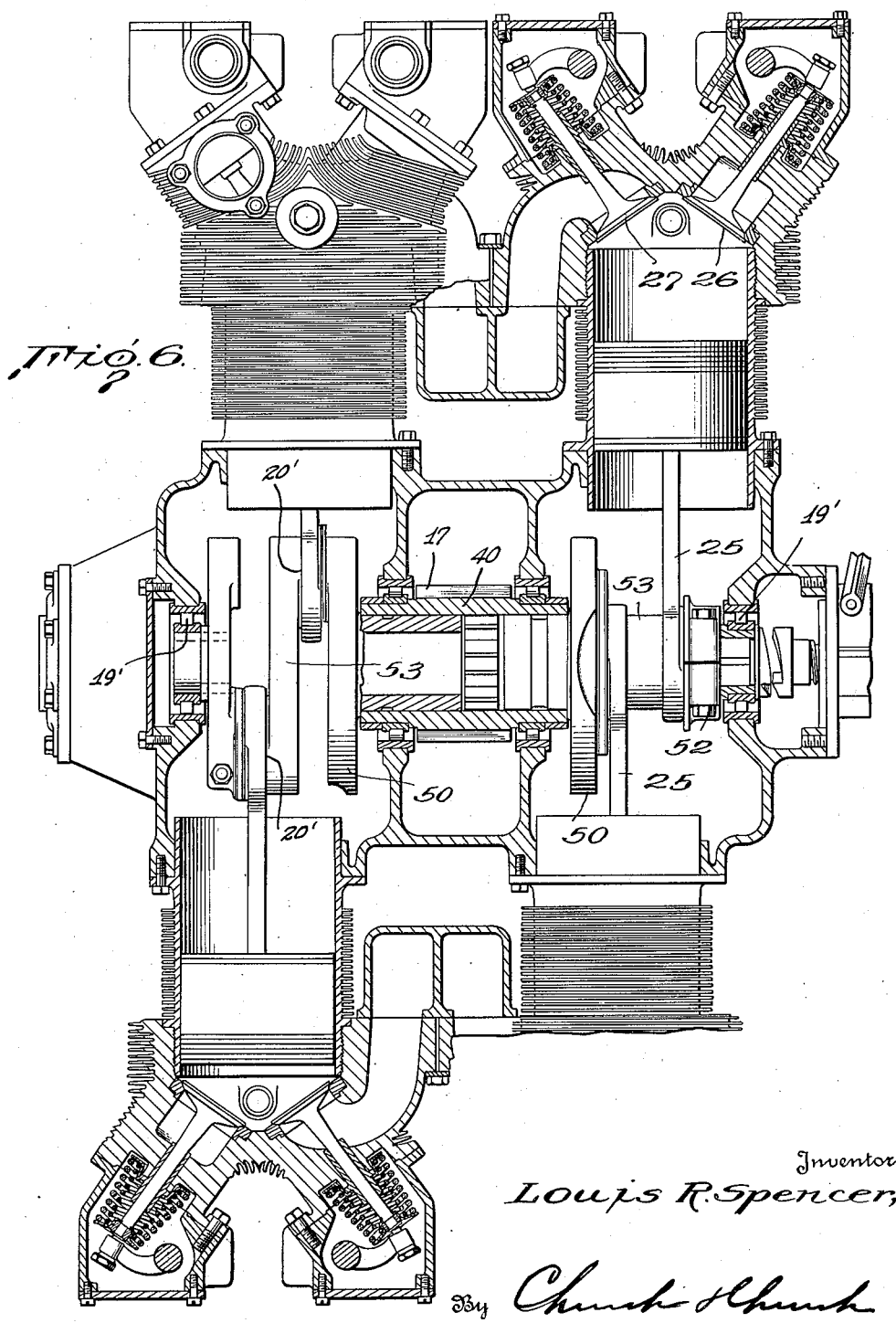

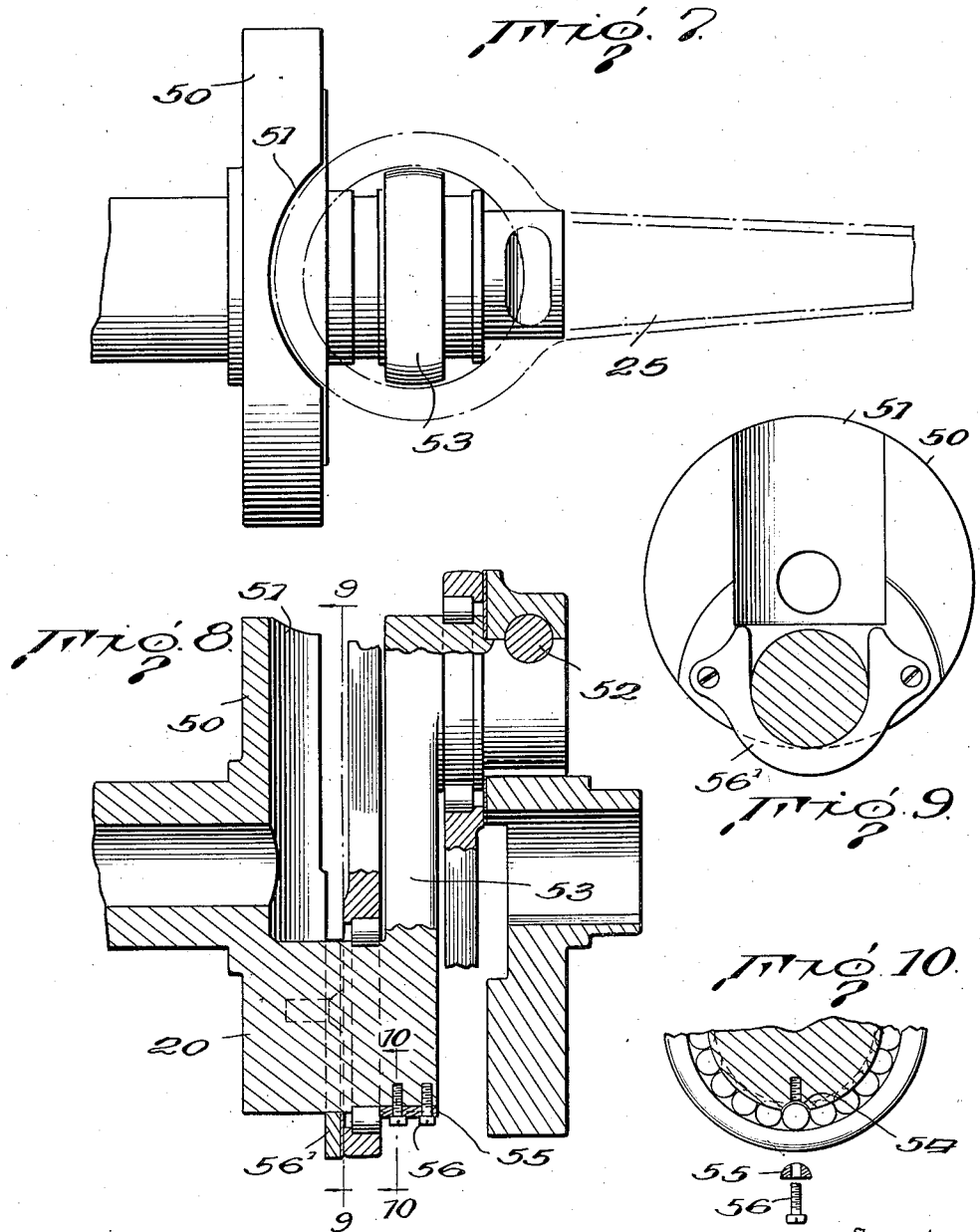

Patented Apr. 25, 1939

2,156,202

UNITED STATES PATENT OFFICE 2,156,202

AIRPLANE ENGINE

Louis R. Spencer, West Hartford, Conn., assignor to Spencer Aircraft Motors, Inc., Hartford, Conn., a corporation of Connecticut Application December 23, 1936, Serial No. 117,378

1 Claim. (Cl. 123—56)

This invention relates to improvements in air-cooled, fixed-opposed cylinder, four-cycle internal combustion engines of the type disclosed in my United States Letters Patent No. 1,816,406, issued July 28, 1931.

One object of my invention is to provide an engine of this character possessing a high mechanical efficiency in that anti-friction elements, preferably roller bearings are utilized, particularly in the connection for the piston connecting rods whereby friction, and consequent heating, is reduced.

A further object is to simplify the assembly of the connecting rods on the crank shaft.

A still further object is to provide an engine having the cylinders offset with respect to each other longitudinally of the drive shaft, this offset being reduced to a minimum by the use of connecting rods of comparatively narrow width and of anti-friction elements between the connecting rods and the crank arms to which said rods are attached.

Another object is to overcome or compensate for variations in valve clearances normally resulting from expansion and contraction of the cylinder and crank case. Briefly, this is accomplished by locating the valves and the cam shaft for actuating said valves rather close to each other.

A further object of the invention is to minimize vibration created by the movement of the connecting arms and cranks for the several cylinders by arranging the various arms and cranks in such relative positions that the members at opposite sides, so to speak, of the drive shaft tend to balance one another.

A still further object is to obtain a high volumetric efficiency for the engine by placing the valves at an angle to the longitudinal axis of the cylinder.

A still further object of the invention is to provide a tubular drive shaft permitting the mounting of a machine gun barrel therein whereby the gun may fire on a line axially of the propeller, thus eliminating the necessity of timing mechanism such as is required in aircraft where the gun fires between the propeller blades.

With these and other objects in view, the invention consists in certain details of construction and combinations and arrangements of parts, all as will hereinafter be more fully described and the novel features thereof particularly pointed out in the appended claim.

In the accompanying drawings, illustrating the invention in connection with the propeller shaft of an aircraft, Figure 1 is a sectional view taken in a vertical plane transversely of the propeller shaft, portions of two cylinders being shown partially in elevation;

Fig. 2 is a sectional view in a horizontal plane substantially through the propeller shaft;

Fig. 3 is a similar horizontal sectional view taken substantially in the plane of one of the crank shafts from which the propeller shaft is driven;

Fig. 3a is a detail sectional view illustrating one of the fuel valves of a cylinder;

Fig. 4 is a vertical sectional view longitudinally of the propeller shaft;

Fig. 5 is a vertical sectional view longitudinally of the propeller shaft, illustrating an eight-cylinder engine construction and the mounting of a machine gun with the propeller shaft;

Fig. 6 is a sectional view in a horizontal plane substantially intersecting one of the crank shafts of the engine illustrated in Fig. 5;

Fig. 7 is a plan view of a portion of one of the crank shafts;

Fig. 8 is a longitudinal sectional view of the structure illustrated in Fig. 7;

Fig. 9 is a sectional view on the line 9—9 of Fig. 8; and

Fig. 10 is a detail sectional view on the line 10—10 of Fig. 8.

The present engine, in certain respects, is of substantially the same construction as that shown in my prior patent before referred to, and reference is made to that patent for a further disclosure and description of certain details. For instance, in the four-cylinder engine illustrated in Figs. 1 to 4, the cylinders are arranged in pairs, the cylinders of each pair, 21—22, 23—24, being disposed horizontally at opposite sides of the drive or propeller shaft, but offset with respect to each other longitudinally of said shaft.

The casing 11 of the engine is divided at the middle (Fig. 1) facilitating assembly and disassembly. The propeller shaft 12, preferably of tubular formation, and straight, is supported by bearings 13 set into the casing 11, the bearings preferably being shown as provided with anti-friction elements 14. Intermediate the ends of casing 11, the propeller shaft is supported by bearings 15. Mounted on propeller shaft 12 is a gear 16, preferably of the herringbone type meshing with gears 17 on crank shafts 18, 18a, at opposite sides of said propeller shaft, the gear ratio indicated in the present instance being three to five as this arrangement has proven very satisfactory in tests heretofore made of the engine. Crank shafts 18, 18ª, are journaled in roller bearings 19 at their ends and intermediate portions. It will be noted that the cranks 20, 20ª, 120 and 120ª, of each shaft are comparatively close together for reasons which will be more fully set forth hereinafter. The offset of the cranks corresponds, of course, to the offset of the cylinders 21, 22 and 23, 24, the connecting rods 25 of the several cylinders being attached to the several cranks as later described. The inlet and exhaust valves 26, 27 of the cylinders (Figs. 3ª and 6) are actuated by push rods 28 engaging against rocker arms 29 which are provided with cam rollers 30 associated with cam surfaces 31 on cam shafts 32 driven by gears 33, 34, on said cam shafts and propeller shaft, respectively. Cam shafts 33 are journaled in bearings 35 in the casing 11, anti-friction elements, preferably in the form of ball bearings being used in this instance.

The use of anti-friction elements throughout the engine, including particularly the attachment of the connecting rods to the crank shafts, insures a high mechanical efficiency for the engine. They undoubtedly reduce friction and consequently reduce the heat within the crank case. Also, under reasonable conditions they are substantially free from wear and, even in case of a momentary shortage of lubricant, will not cause bearing failure. As previously mentioned, the offset of the cylinders of each pair is also reduced to a minimum by very thin connecting rods. Said rods are sufficiently wide to possess the necessary strength. By the use of crank rods of thin type and the use of the anti-friction elements, the offset of the cylinders is reduced about one-third of that of the engine of my prior patent before referred to. Another advantage of this feature is that with the cranks and connecting rods close together, the planes of torque applied to the crank shafts by opposing cranks are close together and there is practically no twist given to the crank shafts. Also, a reduction in the size of the casing is made possible. Certain difficulties were encountered in assembling the roller bearings in the big ends of the cranks but the same have been overcome as shown in Figs. 7 to 10 to be presently described. The use of roller bearings in the connecting rod big end eliminates the use of white metal linings or bushings therein, thus permitting the use of connecting rods of relatively narrow width with the consequent reduction in cylinder offset. Furthermore, experience has demonstrated that with engines running under severe loads and at high speeds, the white metal lined connecting rods are not to be relied upon, even under the most favorable lubricating conditions. With the linings, it is impossible to eliminate frictional heat. Likewise, it is impossible to prevent grit, small particles of steel and other foreign matter gaining access to the lining so that when the oil film starts to break down, consequent abrasive action by the foreign particles imposes undue wear on the bearing. Briefly, then, the use of anti-friction elements in the connecting rods eliminates wear on the bearing; reduces frictional heat; and what is most important, increases the rigidity of the engine by reason of the reduced offset of paired cylinders.

Another important feature is the arrangement for actuating the inlet and exhaust valves of the cylinders in that the provision of the cam shafts 32, permits the use of comparatively short push rods 28. The inertia of the entire valve actuating mechanism is thus reduced. In addition, variations in valve clearance due to expansion and contraction of the cylinders and crank case are overcome to a great extent by the use of short push rods.

In order to eliminate or minimize vibration, the crank shafts have also been placed in such positions relatively to each other that the combined weight of the connecting rod big end and the crank pin of one crank shaft is balanced out by the like elements of the opposite crank shaft in that in one cycle these opposite assemblies move toward each other in a circular path while in the next succeeding cycle they move in opposite directions or away from each other.

To secure this result, the cranks of one crank shaft are alined with those of the other crank shaft transversely of the propeller shaft. For instance, as illustrated in Figs. 1 and 4, cranks 20, and 20ª of the two crank shafts are in the same transverse plane and cranks 120, 120ª are, likewise, in the same plane with each other and by properly disposing the several cranks relatively to their respective shafts, cranks 20, 20ª will move toward each other during a portion of each revolution of their shafts while during the same portion of said cycle cranks 120, 120ª will be moving away from each other. Likewise, during the remainder of the cycle cranks 120, 120ª move toward each other and cranks 20, 20ª move away from each other. Consequently, the inertias of the opposing offset connecting rods and cranks counterbalance each other at all times, and the inertias of those elements, in the same transverse plane, counterbalance each other so that the torque applied to the gears and transmitted to the propeller shaft is uniform regardless of the speed of operation.

The efficiency of the present engine is also increased by the special arrangement of the inlet and exhaust valves 26, 27 for the cylinders. As shown, in Fig. 3ª, the faces of the valves are inclined or disposed at an angle to each other and at an angle to the longitudinal axis of the cylinder whereby a free flow of fuel gas is obtained at high speeds, thus securing a high volumetric efficiency. It will also be observed that the valves are of liberal size and have comparatively high lifts.

The mode of operation of the engine is the same as that of my prior patent previously referred to and a detailed description of the same is deemed unnecessary here.

The construction of Figs. 5 and 6 illustrates an eight-cylinder engine. In this instance, the crank shafts are formed in alined sections, so to speak, each section having two cranks 20' for the connecting rods 25 of a pair of opposed cylinders. The opposed ends of the sections of each crank shaft are journaled in bearings 19' and their juxtaposed ends are secured in a tubular member 40 provided with exterior gear teeth, thus forming the gear 17 which meshes with the herringbone gear 16 on the propeller shaft. The herringbone gear 16 is formed of axially spaced gear toothed members and located in the space between said members is the gear 34 for meshing with and driving the gear on the cam shaft (not shown), from which the valves are actuated. Partitions or ribs in the crank case provide support for anti-friction bearings 42 for the gear sleeve 40 and contiguous ends of the crank shaft sections, as well as for anti-friction bearings 43 for the intermediate portion of the propeller shaft. The crank shafts and propeller shafts are, therefore, amply supported both at the ends of the crank case and at intermediate points. In this eight-cylinder construction, the use of anti-friction elements, in lieu of white metal linings in the connecting rods, is of further importance in that the reduction in the off-setting of paired cylinders greatly reduces the overall length of the crank case. This not only leads to structural rigidity but also decreases the weight of the unit as a whole.

The inclination of the cylinders 26, 27, shown in this form of engine, and the advantages thereof, have heretofore been described. This form of the invention is also utilized for illustration of the use of a tubular propeller shaft with the barrel 45 of a machine gun mounted axially thereof. Such an arrangement will eliminate the necessity of timing apparatus such as is required where guns of this type mounted on aircraft fire between the blades of the propeller.

To facilitate the assembly of the anti-friction elements in the big ends of the connecting rods encircling the crank shaft, the cranks and connecting rods are formed as shown in detail in Figs. 7 to 10. In this construction, the enlarged end of each connecting rod adapted to encircle the crank shaft is made integral or continuous (not split as is customary) and the crank shaft is formed in sections, one section comprising the two crank portions 20 adapted to be secured to the other section by a pin 52. The offset or counterbalance portion 50 of what will, for convenience, be termed the crank section, has an elongated recess 51 in one face extending from the crank 20 to the free end of said offset. The recess 51 is of arcuate cross-section struck on a radius corresponding substantially to that of the big end of the connecting rod. The connecting rods are assembled on the shaft before the two shaft sections are keyed together. As shown in Fig. 7, the big end of one crank is engaged over the portion 53 of the shaft, with its curved end engaging in recess 51 and then slipped down over, so to speak, the portion 53 until it can be given a quarter turn to position it at right angles to the shaft with the big end encircling the crank 20, as shown in Fig. 8. The exposed face of crank 20 is also cut away or recessed as at 54, the curvature of said recess conforming to the periphery of the roller bearings used in the connection. After the connecting rod has been installed as just described the roller bearings are successively inserted between the rod and crank, the recess 54 affording sufficient clearance for this purpose. When the bearings have all been thus inserted, a filler 55 for the recess 54 is then secured in place by one or more screws 56. A shim 56' is preferably inserted and secured in place as shown in Figs. 8 and 9, to take up clearance between the side face of the big end of the connection rod and crank 20. The other connecting rod is then secured on the stub end of the shaft section, after which the two sections are secured together by the pin 52. As before mentioned, this means for facilitating the use of anti-friction elements for the connecting rod permits the offset of the cylinders to be reduced and at the same time increases the efficiency of the engine as compared with the use of white metal linings at this point.

What I claim is:

In an internal combustion engine, a propeller shaft, a pair of crank shafts arranged at diametrically opposite sides of the propeller shaft and operatively associated therewith, each crank shaft having a pair of oppositely extending crank arms with each arm of one crank shaft alined with an arm of the other crank shaft transversely of said shafts, a pair of opposed cylinders for each crank shaft, pistons in said cylinders and a connecting rod between each piston and one of said crank arms, the disposition of the crank arms relatively to their respective shafts being such that the transversely alined arms will move toward each other during a portion of one revolution and, during the remainder of such revolution will move away from each other, with one alined pair of arms moving toward each other while the other alined pair move away from each other, the inertias of the opposing offset connecting rods and cranks counterbalancing each other at all times and the inertias of the transversely alined crank arms counterbalancing each other whereby a substantially uniform torque is imposed on the propeller shaft.

LOUIS R. SPENCER.